United States Patent [19]
Samuelson

[11] Patent Number: 5,796,551
[45] Date of Patent: Aug. 18, 1998

[54] LANDING PADS FOR AIR BEARING SLIDERS AND METHOD FOR MAKING THE SAME

[75] Inventor: Laurence S. Samuelson, San Jose, Calif.

[73] Assignee: International Business Machines Corporation, Armonk, N.Y.

[21] Appl. No.: 732,201

[22] Filed: Oct. 16, 1996

[51] Int. Cl.⁶ .................................................. G11B 5/60
[52] U.S. Cl. ........................................................ 360/103
[58] Field of Search ............................................ 360/103

[56] References Cited

U.S. PATENT DOCUMENTS

| 4,894,740 | 1/1990 | Chhabra et al. | 360/103 |
| 5,062,017 | 10/1991 | Strom et al. | 360/103 |
| 5,079,657 | 1/1992 | Aronoff et al. | 360/103 |
| 5,267,109 | 11/1993 | Chapin et al. | 360/103 |
| 5,396,386 | 3/1995 | Bolasna et al. | 360/103 |
| 5,406,432 | 4/1995 | Murray | 360/103 |
| 5,424,888 | 6/1995 | Hendriks et al. | 360/103 |
| 5,452,151 | 9/1995 | Money et al. | 360/75 |
| 5,572,386 | 11/1996 | Ananth et al. | 360/103 |
| 5,625,512 | 4/1997 | Smith | 360/103 |

FOREIGN PATENT DOCUMENTS

| 61-160885 | 1/1985 | Japan . |
| 62-110680 | 11/1985 | Japan . |
| 1-133274 | 11/1987 | Japan . |
| 1-211383 | 2/1988 | Japan . |
| 2-235274 | 3/1989 | Japan . |
| 4-195779 | 11/1990 | Japan . |
| 6-111508 | 9/1992 | Japan . |
| 6-150283 | 10/1992 | Japan . |

*Primary Examiner*—Robert S. Tupper
*Attorney, Agent, or Firm*—Merchant, Gould, Smith, Edell, Welter & Schmidt, P.A.

[57] ABSTRACT

Air bearing sliders having landing pads to provide a smooth contact surface during shock or loading and unloading. The contact surface is smoother than the etched surface area of the slider. The air bearing slider includes a support structure, an air bearing surface disposed on the support structure above the etched surface area and facing the moving recording medium, for providing a pressurization plane for providing lift to the slider, and a landing pad, coupled to the support structure, for providing a contact surface, wherein the contact surface of the landing pad is smoother than the etched surface area. The contact surface of the landing pad may be below or within the pressurization plane of the air bearing surface. A landing pad may be disposed at an outer corner of the slider to provide a smooth contact surface during skew conditions. The landing pad may also be formed in conjunction with the formation of air bearing surface features such as TPC steps, stepped tapers or trailing edge rail shaping.

29 Claims, 11 Drawing Sheets

LANDING PADS FOR AIR BEARING SLIDERS AND METHOD FOR MAKING THE SAME

BACKGROUND OF THE INVENTION

1. Field of the Invention.

This invention relates in general to air bearing sliders, and more particularly, to air bearing sliders having landing pads to provide a smooth contact surface during shock or loading.

2. Description of Related Art.

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

In magnetic recording technology, it is continually desired to improve the areal density at which information can be recorded and reliably read. Because the recording density of a magnetic disk drive is limited by the distance between the transducer and the magnetic media, a goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

One improvement in magnetic disk drives technology involves zone bit recording. Zone bit recording can provide significant performance and capacity improvements in magnetic disk storage files. However, in order to facilitate this technology, it is desirable for the air bearing slider to maintain a constant spacing between the read/write head and the disk across all the zones, from the inner-diameter (ID) radius to the outer-diameter (OD) radius of the disk. This presents a key technical challenge, since the air velocity created by the rotating disk varies in both magnitude and direction relative to the slider at all radii. Again, the situation is further exacerbated in files with rotary actuators, as the slider skew angle is varied across the ID-OD data band.

Thus, in addition to achieving a small average spacing between the disk and the transducer, it is critical that a slider fly at a relatively constant height despite the large variety of conditions it experiences during the normal operation of a disk drive. If the flying height is not constant, the data transfer between the transducer and the recording medium may be adversely affected. It is also essential that variations in the physical characteristics of the slider, due to manufacturing tolerances, not substantially alter the flying height of the slider. If this result is not achieved, the slider's nominal fly height must be increased to compensate for variations between sliders.

An example of a parameter that can vary during normal operation of a disk drive is the radial position of a slider with respect to the rotating disk. The flying height of a slider is affected as the actuator arm is moved radially to access different data tracks. This is due to differences in the linear velocity of the disk at differing radii. In effect, the air bearing slider flies at different speeds at differing radii. Because a slider typically flies higher as velocity increases, there is a tendency for sliders to fly higher at the outer diameter of the disk. Disk drives and sliders must be designed to minimize this effect.

A slider also experiences changes in flying height due to variations in skew. Skew is a measure of the angle formed between the longitudinal axis of the slider and the direction of disk rotation as measured in a plane parallel to the disk. Skew varies in a rotary actuator disk drive as the suspension and attached slider move in an arcuate path across the disk. Skew also varies, to a lesser degree, in a linear actuator disk drive when a resiliently mounted slider moves in response to forces exerted upon it. In addition, skew is a concern due to manufacturing tolerances that may cause a slider to be mounted with a permanent, non-zero skew. For sliders mounted to either type of actuator, nonzero skew values result in a slider being pressurized at a reduced value and therefore flying lower. For this reason, it is important that a slider be relatively insensitive to variations in skew.

A slider also experiences fly height variations due to roll. For a slider with zero skew relative to disk rotation, roll is a measure of the angle of rotation about the longitudinal axis of the slider. Variations in roll occur when a resiliently mounted slider experiences a skewed air flow or the actuator impacts the disk. Insensitivity to roll variations is a crucial requirement of air bearing sliders.

Variations in the crown of a slider can also lead to variations in fly height. Crown is a measure of the concave or convex bending of the slider along its longitudinal axis. Crown develops in sliders because of surface stresses that arise during the fabrication and suspension bonding processes. These stresses are not well controlled and therefore lead to sliders with relatively large variations in crown. Also, an individual slider can experience variations in its crown due to temperature variations that occur during the normal operation of a recording disk drive. For these reasons, it is important that the flying height of a slider not vary substantially as a result of variations in crown. Furthermore, a slider with a non-zero crown is the equivalent of a flat slider flying over a disk having small amplitude, long wavelength undulations. Therefore, since all disks have some degrees of waviness, a slider that is less sensitive to variations in crown is also less sensitive to imperfections in the flatness of the recording disk it is flying over.

Finally, a slider experiences varying conditions during the high speed radial movement of the actuator as it accesses data on various portions of the disk. High speed movement across the disk can lead to large values of slider roll and skew and a resultant variation in fly height. This is yet another reason that a slider must be insensitive to changes in roll and skew.

A wide variety of slider air bearing surface designs have been proposed and implemented to reduce fly height variations. However, most designs are still subject to occasional variation in fly heights.

When any of the above described variations in fly height occur, they may result in contact between the slider and the rapidly rotating recording medium. Any such contact leads to wear of the slider and the recording surface and is potentially catastrophic.

Current negative pressure slider designs utilize a shallow etch depth (4–5 μm) to define the air bearing geometry. However, some etch processes, e.g., reactive ion etching (RIE), result in a very rough etched surface to the slider substrate material.

Thus, it can be seen then that there is a need for an air bearing slider design which includes a smooth contact surface which prevents damage to the disk surface during shock or loading.

It can also be seen that there is a need for an air bearing slider design which protects the disk surface during shock or loading and unloading, and if desired, does not contribute to air bearing or fly height performance.

SUMMARY OF THE INVENTION

To overcome the limitations in the prior art described above, and to overcome other limitations that will become apparent upon reading and understanding the present specification, the present invention discloses air bearing sliders having landing pads to provide a smooth contact surface during shock or loading.

The present invention solves the above-described problems by providing a contact surface that is smoother than the etched surface area of the slider.

A system in accordance with the principles of the present invention includes a support structure, an air bearing surface disposed on the support structure above the etched surface area and facing the moving recording medium, for providing a pressurization plane for providing lift to the slider, and a landing pad, disposed on the support structure, for providing a contact surface, wherein the contact surface of the landing pad is smoother than the etched surface area.

One aspect of the present invention is that the contact surface of the landing pad may be below the pressurization plane of the rails of the air bearing surface.

Another aspect of the present invention is that the contact surface of the landing pad may rise to the level of the pressurization plane of the air bearing surface.

Another aspect of the present invention is that the landing pad is disposed at an outer corner of the slider.

Yet another aspect of the present invention is that the landing pad configuration comprises two landing pads, a landing pad being disposed at each outer corner of the slider proximate to the trailing edge or to the leading edge.

Another aspect of the present invention is that the air bearing surface comprises a central rail terminating proximate to the trailing edge of the slider, and wherein the landing pad comprises two landing pads, a landing pad being disposed at each outer corner of the slider proximate to the trailing edge on opposite sides of the central rail.

Another aspect of the present invention is that the landing pad is formed in conjunction with the formation of modified air bearing surface features.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an air bearing slider design which protects the disk surface during shock or loading but which does not contribute to air bearing or fly height performance.

Figure 1:
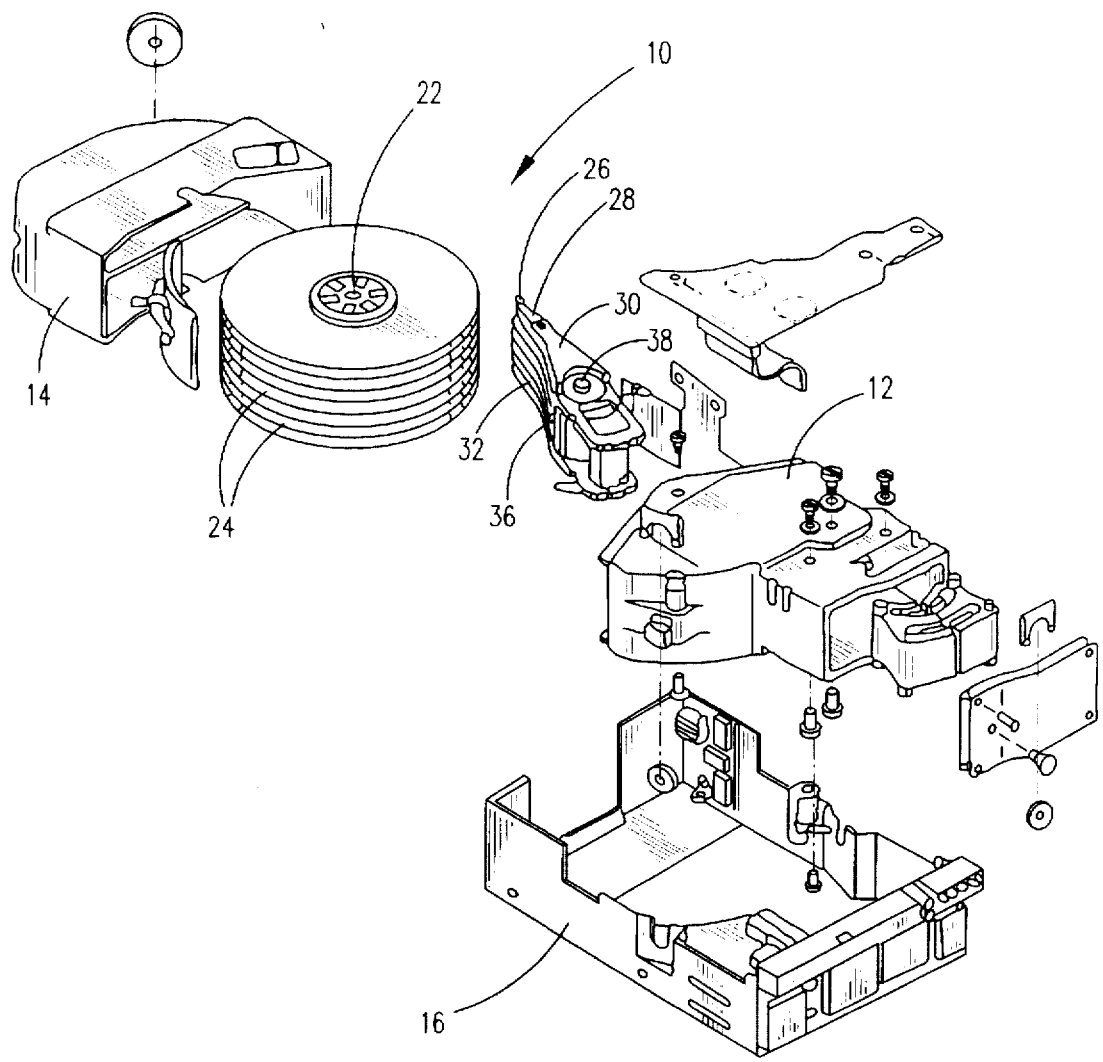
FIG. 1 is an exploded view of a disk drive suitable for practicing the present invention.

FIG. 1 is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122 which is powered by a motor (not shown). Information is written on or read from the disks 124 by heads or magnetic transducers (not shown) which are supported by sliders 126. Preferably, sliders in accordance with the invention are coupled to the suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138. However, those skilled in the art will readily recognize that the invention is not limited to the data storage device described above.

Figure 2:
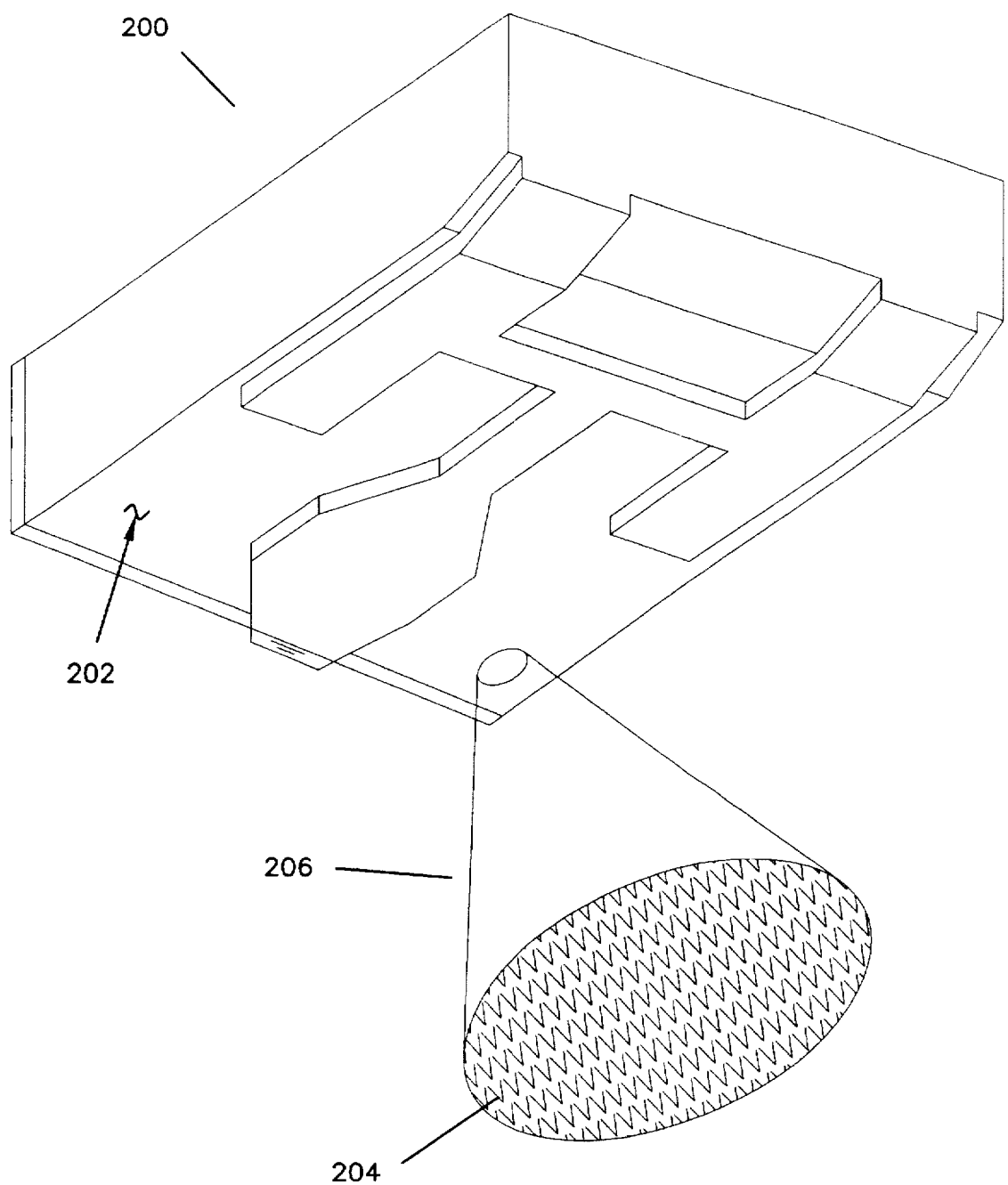
FIG. 2 illustrates a prior art slider having etched recesses with protrusions.

FIG. 2 illustrates a prior art slider design 200 which may be used in a storage device as described above with reference to FIG. 1. The prior art slider design 200 has an etched surface 202 with sharp protrusions 204 resulting to the etching process mentioned earlier. The etched surface 202 of the support structure appears to have sharp protrusions 204 when viewed under magnification as illustrated in the enlarged view 206 of the etched surface 202. When the slider 200 is subjected to severe shock, these sharp protrusions 204 can impact on the disk surface resulting in a thermal asperity and a loss of customer data.

Additionally, suspension static attitude offsets due to manufacturing tolerances can lead to similar damage when utilizing a load/unload mechanism or during the actuator/disk stack merge operation. These conditions can result in the sharp protrusions 204 of the rough etched surface corner touching down on the disk surface and inducing a thermal asperity. Contact between the rough surfaces and the disk result in damage to the disk surface, loss of customer data or both.

Figure 3:
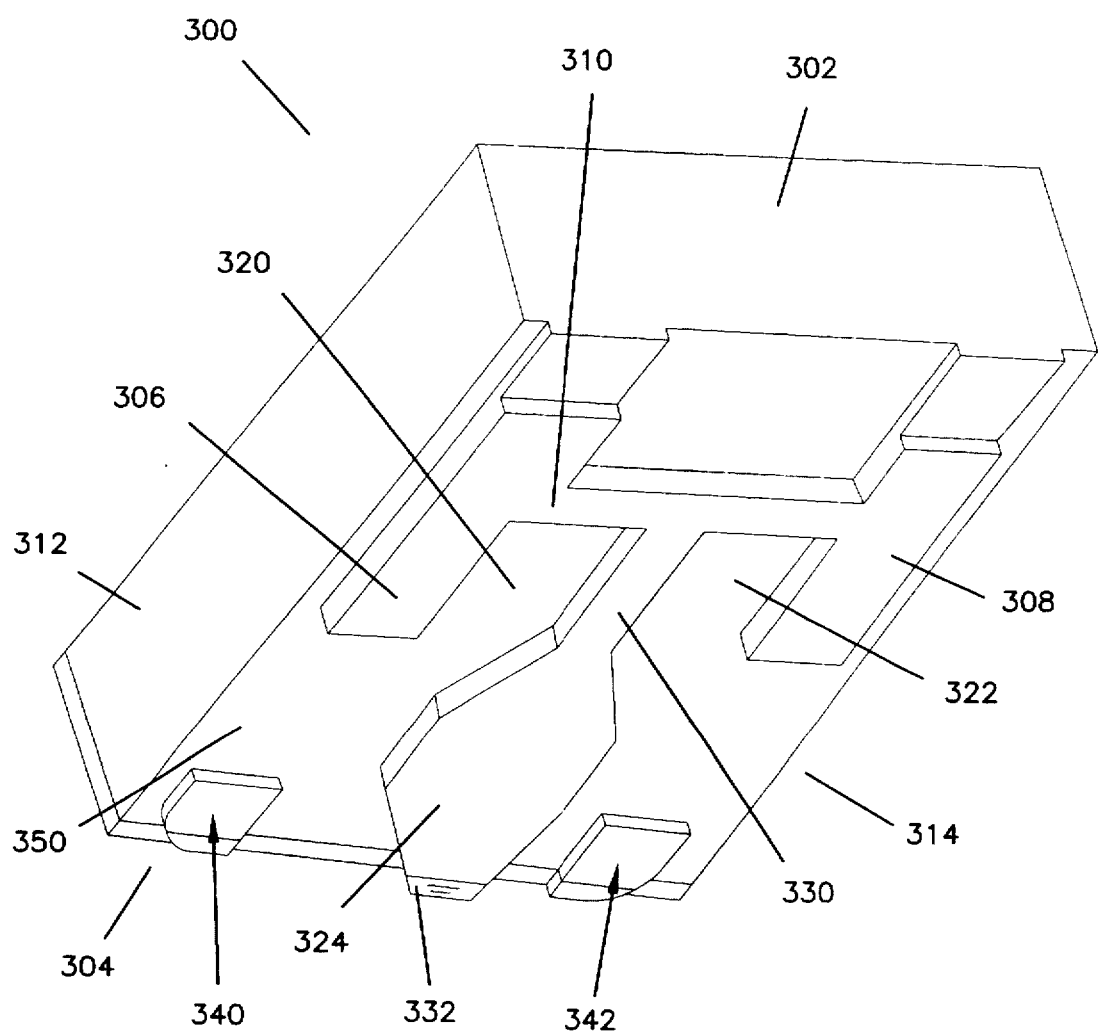
FIG. 3 illustrates the features of an air bearing slider which includes landing pads according to the invention to provide smooth contact surfaces.

FIG. 3 illustrates the features of an air bearing slider 300 which includes landing pads 340, 342 to provide smooth contact surfaces for air bearing sliders 300. The air bearing slider 300 includes a leading edge 302 and a trailing edge 304 disposed at opposite ends of a longitudinal axis running the length of the slider. The air bearing slider 300 further includes a left rail 306, a right rail 308 and a connecting crossbar 310 therebetween. The left rail 306 and right rail 308 are substantially parallel to sides 312, 314 of the air bearing slider 300 which are in turn parallel to the longitudinal axis. The crossbar 310 may be either perpendicular or oblique to the sides 312, 314 of the slider 300. Extending from the center crossbar 310 is a center rail 330. Two generally U-shaped recessed areas 320, 322 are formed between the center rail 330 and the two side rails 306, 308 for creating negative pressure as the disk spins beneath the air bearing slider 300. At the trailing edge 304 of the center rail 330, a broader area 324 for supporting a magnetic element 332 is provided. Finally, landing pads 340, 342 are provided at the outer corners of the air bearing slider 300. The size and shape of the landing pads 340, 342 are chosen to provide a smoother contact surface than the etched surface 350 of the support structure during loading or unloading, or in the event of shock, while not contributing significantly to the air bearing or fly height performance.

Figure 4:
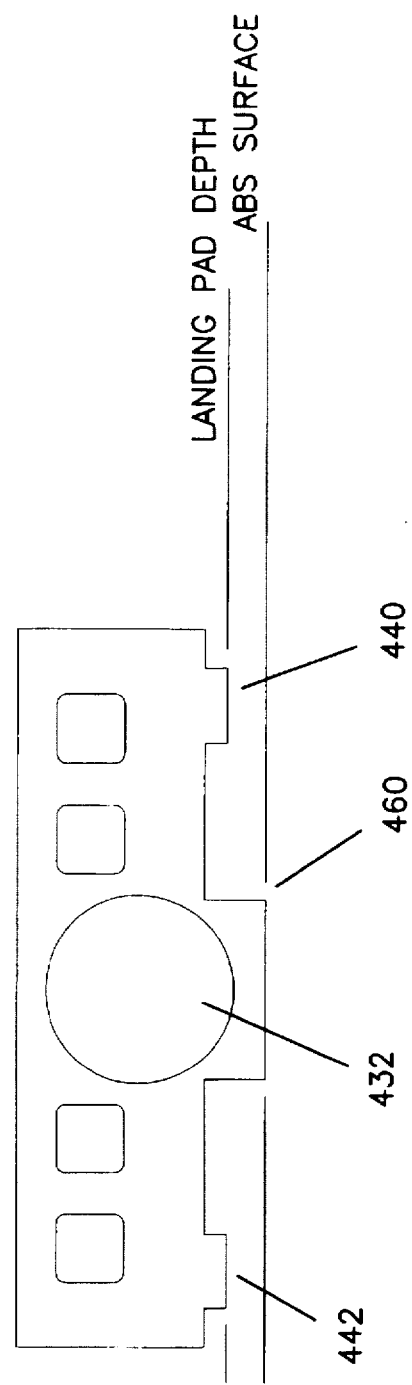
FIG. 4 shows a rear view of the slider of FIG. 3.

As illustrated with reference to FIG. 4, which shows a rear view of the slider of FIG. 3, the surface of the landing pads 440, 442 is recessed from the plane of the air bearing surface 460, e.g., by an ion milling process in the preferred embodiment. This insures that the minimum spacing remains located near the transducer 432 while the slider is flying.

Figure 5:
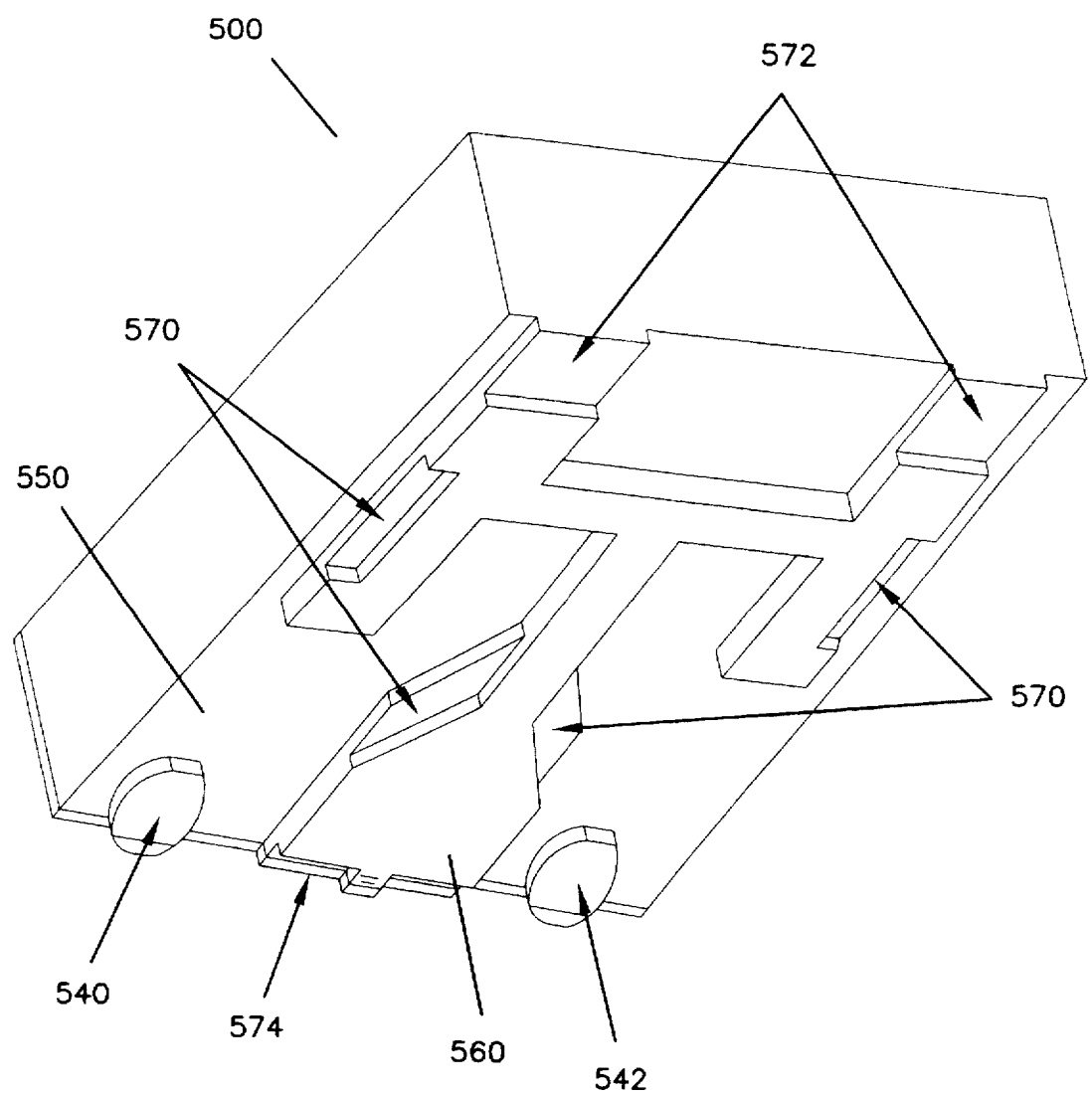
FIG. 5 illustrates another exemplary slider design with landing pads according to the present invention.

FIG. 5 illustrates another exemplary slider design 500 with ion-milled landing pads 540, 542 according to the present invention. In FIG. 5, additional ion milled features are also illustrated, e.g., transverse pressurization contour (TPC) steps 570, stepped tapers 572, and trailing edge (TE) rail shaping 574. The surface roughness of ion milled surfaces is substantially smoother than the RIE surface 550. Accordingly, the ion-milled landing pads 540, 542 contacting the disk will produces much less damage and fewer thermal asperities than that which would result from the RIE surface 550 contacting the disk surface. The depth of the recess between the surface of the landing pads 540, 542 and the plane 560 of the air bearing surface (typically less than 2um) can be selected to be consistent with the modified air bearing surface features formed by the ion milling procedure, such as the TPC steps 570, stepped tapers 572, or trailing edge rail shaping 574 in order to minimize manufacturing costs.

Nevertheless, those skilled in the art will recognize that the process for forming the landing pads 540, 542 is not limited to ion milling, but rather any alternative process capable of providing a smooth surface can be utilized for fabrication of the landing pads 540, 542. Alternatively, the surface of the landing pads 540, 542 need not be recessed from the plane 560 of the air bearing surface. However, in this type of configuration the advantages of the landing pads 540, 542 may be offset by the added variability of the minimum flying height due to slider roll.

It should also be noted that landing pad features 540, 542 may be applied to a large number of air bearing geometries,
and that the number and location of these features are not limited. Other exemplary, alternative embodiments are illustrated with reference to FIGS. 6–11.

Figure 6:
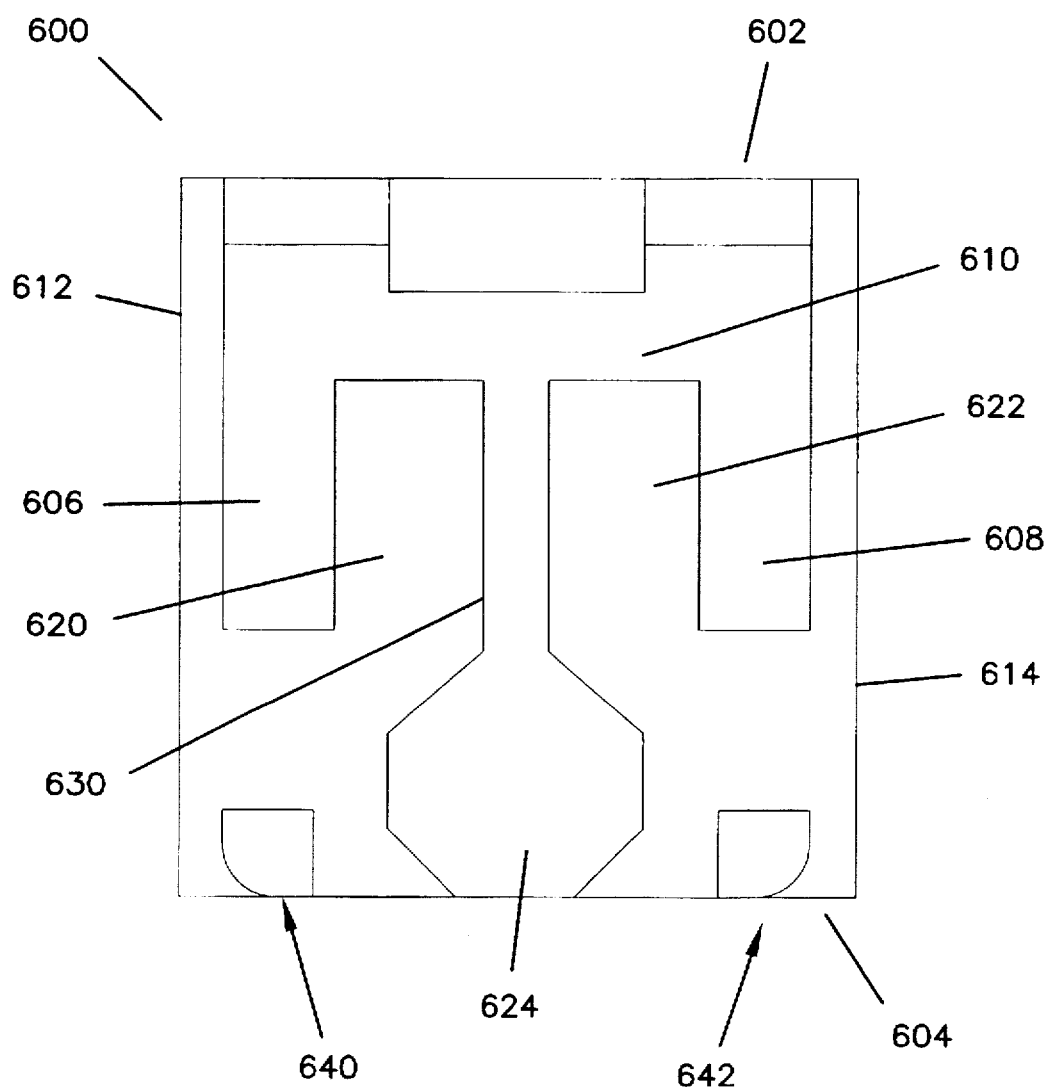
FIG. 6 illustrates the features of an air bearing slider with landing pads level with the air bearing surfaces according to the present invention.

FIG. 6 illustrates the features of an air bearing slider 600 with landing pads 640, 642 according to the present invention that is similar to the design described with reference to FIG. 3. The air bearing slider 600 includes a leading edge 602 and a trailing edge 604 disposed at opposite ends of a longitudinal axis running the length of the slider. The air bearing slider 600 further includes a left rail 606, a right rail 608 and a crossbar 610 therebetween. The left rail 606 and right rail 608 are substantially parallel to sides 612, 614 of the air bearing slider 600 which are in turn parallel to the longitudinal axis. The crossbar 610 may be either perpendicular or oblique to the sides 612, 614 of the slider 600. Extending from the crossbar 610 is a center rail 630. Two generally U-shaped recessed areas 620, 622 are formed between the center rail 630 and the two side rails 606, 608 for creating negative pressure as the disk spins beneath the air bearing slider 600. At the trailing edge 604 of the center rail 630, a broader area 624 for mounting a magnetic element is provided. Finally, landing pads 640, 642 are provided at the outer corners of the air bearing surface. Again, the size and shape of the landing pads 640, 642 are chosen to provide a smoother contact surface during shock or loading. Further, the landing pads may or may not be recessed from the air bearing surfaces as desired.

Figure 7:
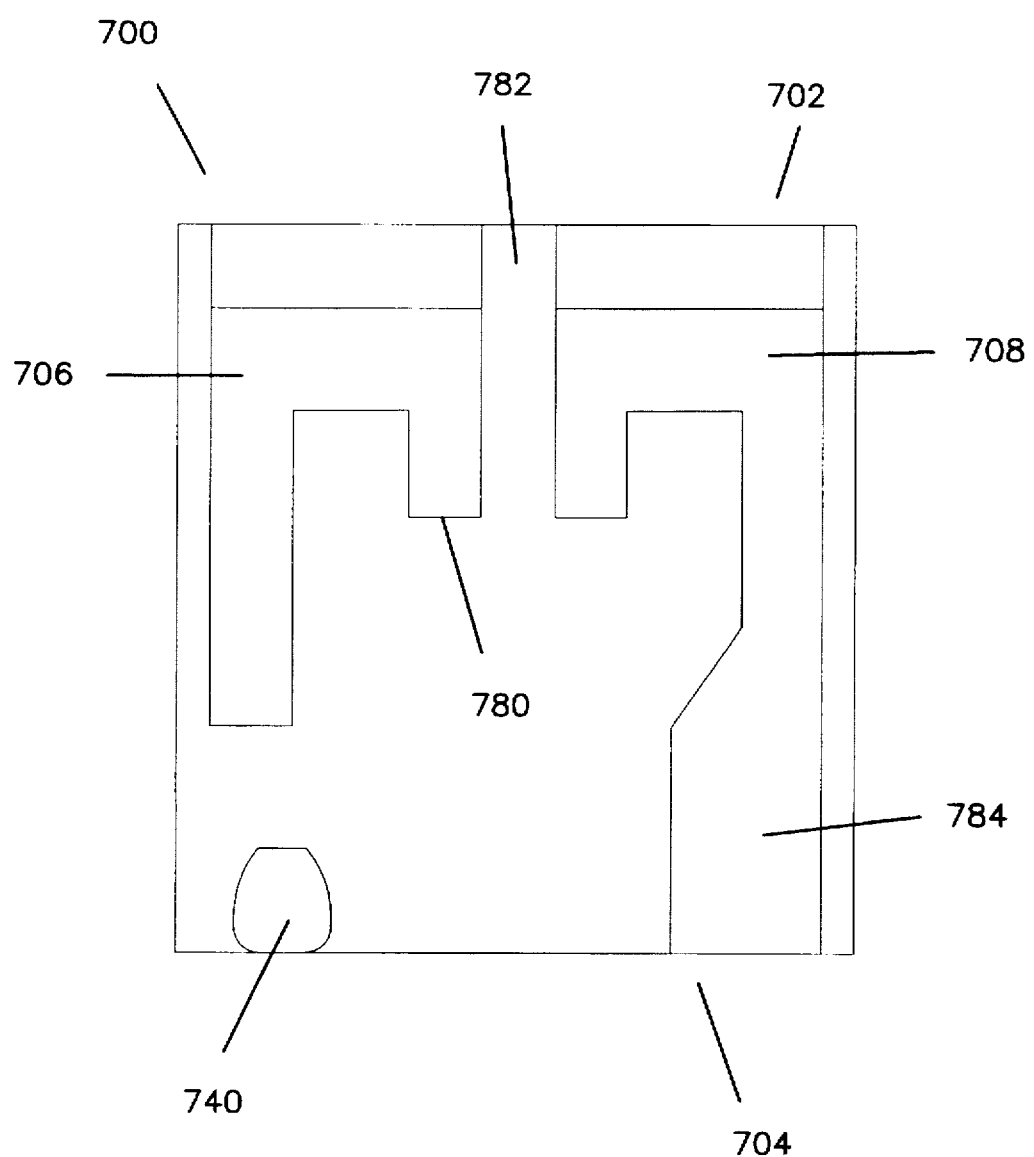
FIG. 7 illustrates the features of an alternative two rail air bearing slider design with a landing pad according to the present invention.

FIG. 7 illustrates the features of an alternative air bearing slider 700 with a landing pad 740 according to the present invention. In FIG. 7, the air bearing slider 700 includes two rails 706, 708, each including a subrail 780. A channel 782 is formed between the two side rails 706, 708. The right rail 708 includes a main portion 784 which extends substantially to the trailing edge 704. The landing pad 740 is disposed opposite the main portion 784 of the right side rail 708 also substantially at the trailing edge 704.

Figure 8:
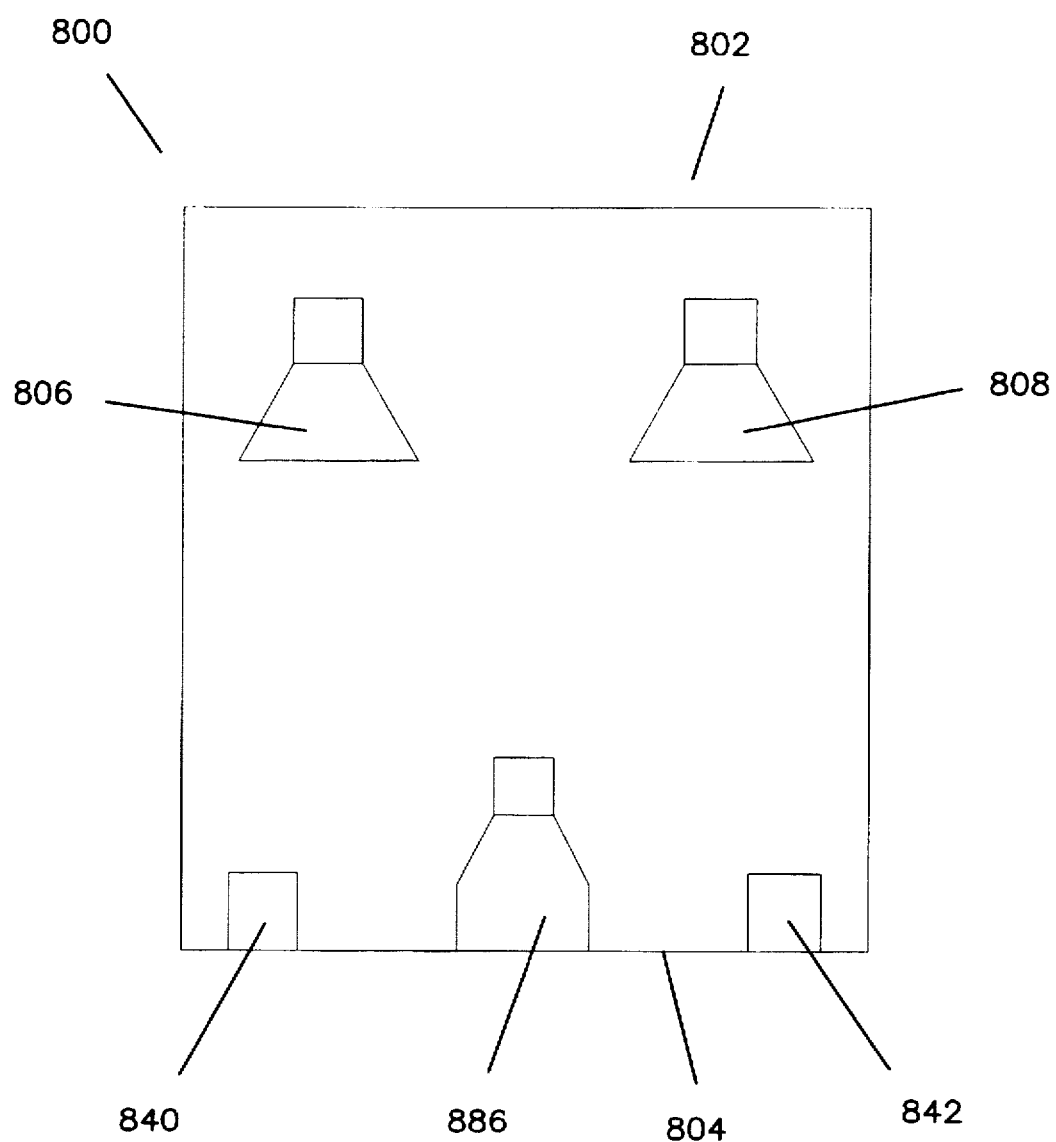
FIG. 8 illustrates a tri-pad air bearing slider design with landing pads according to the present invention.

FIG. 8 illustrates a tri-pad air bearing slider design 800 with landing pads 840, 842 according to the present invention. The slider includes two front pads 806, 808 disposed substantially at the leading edge 802 of the slider 800. A central, trailing pad 886 is disposed substantially at the trailing edge 804. Landing pads 840, 842 are provided at the outer corners of the air bearing slider 800 on opposite sides of the trailing pad 886. Again, the size and shape of the landing pads 840, 842 are chosen to provide a smoother contact surface during shock or loading and unloading. Further, the landing pads may be recessed from the air bearing surfaces if contribution to the air bearing or fly height performance is not desired.

Figure 9:
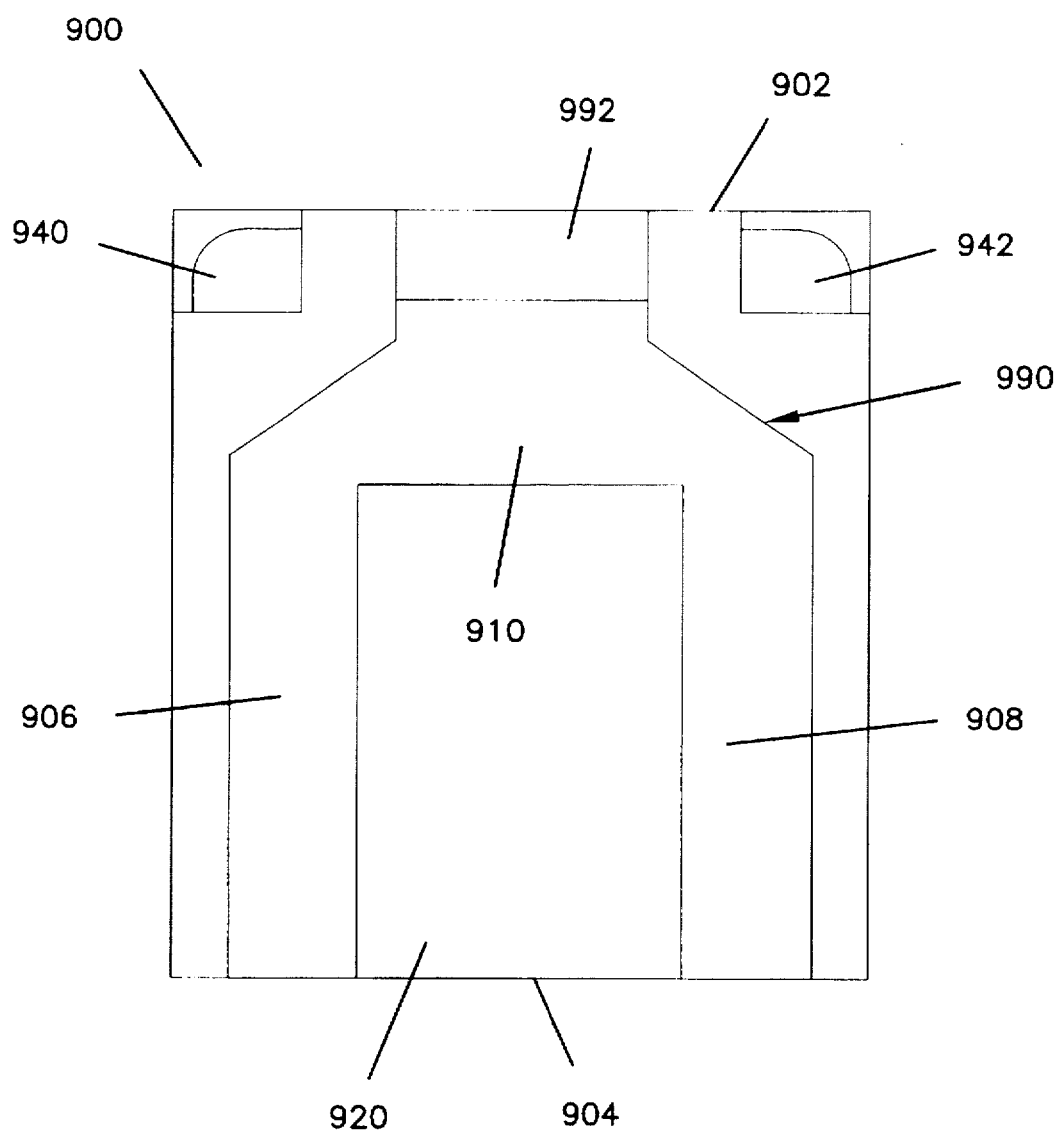
FIG. 9 illustrates an air bearing slider having a generally U-shaped rail configuration with landing pads disposed proximate the leading edge of the slider.

FIG. 9 illustrates an air bearing slider 900 having a generally U-shaped rail 990 configuration with landing pads 940, 942 disposed proximate the leading edge of the slider 900. The air bearing slider 900 includes a leading edge 902 and a trailing edge 904 disposed at opposite ends of a longitudinal axis running the length of the slider 900. The U-shaped rail 990 includes a left rail 906 and a right rail 908 connected by a crossbar 910 therebetween. A generally U-shaped recessed area 920 is formed between the two side rails 906, 908 for creating negative pressure as the disk spins beneath the air bearing slider 900. The crossbar 910 includes a central tapered section 992 extending substantially to the leading edge 902. The landing pads 940, 942 are provided at the outer corners of the air bearing slider 900 at the leading edge 902 of the slider 900 on opposite sides of the central tapered section 992. The size and shape of the landing pads 940, 942 are chosen to provide a smoother contact surface during shock or loading. Further, the landing pads 940, 942 may be recessed from the air bearing surfaces if contribution to the air bearing or fly height performance is not desired. Still further, the landing pads 940, 942 may be tapered to customize fly height performance if desired.

Figure 10:
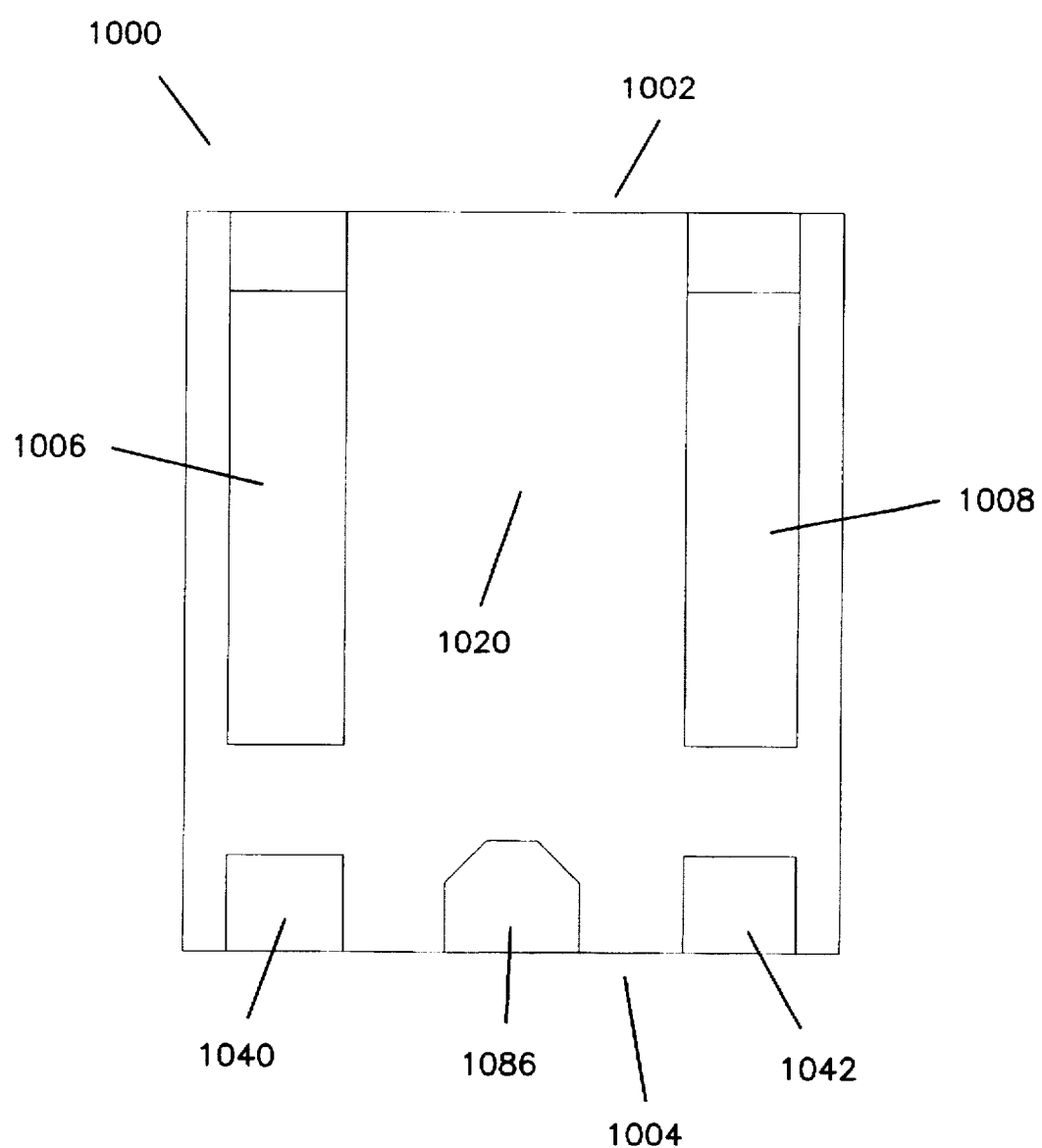
FIG. 10 illustrates an air bearing slider design having a central, trailing transducer pad with adjacent landing pads according to the present invention.

FIG. 10 illustrates a two rail negative pressure design of an air bearing slider 1000 with a central, trailing transducer pad 1086 and landing pads 1040, 1042 according to the present invention. The air bearing slider 1000 has a leading edge 1002, a tailing edge 1004, and two side rails 1006, 1008. A recessed negative pressure area 1020 is formed between the two side rails 1006, 1008. The central, trailing pad 1086 is disposed substantially at the trailing edge 1004. Landing pads 1040, 1042 are provided at the outer corners of the air bearing slider 1000 on opposite sides of the trailing pad 1086. Again, the size and shape of the landing pads 1040, 1042 are chosen to provide a smoother contact surface during shock or loading and unloading. Further, the landing pads may be recessed from the air bearing surfaces if contribution to the air bearing or fly height performance is not desired.

Figure 11:
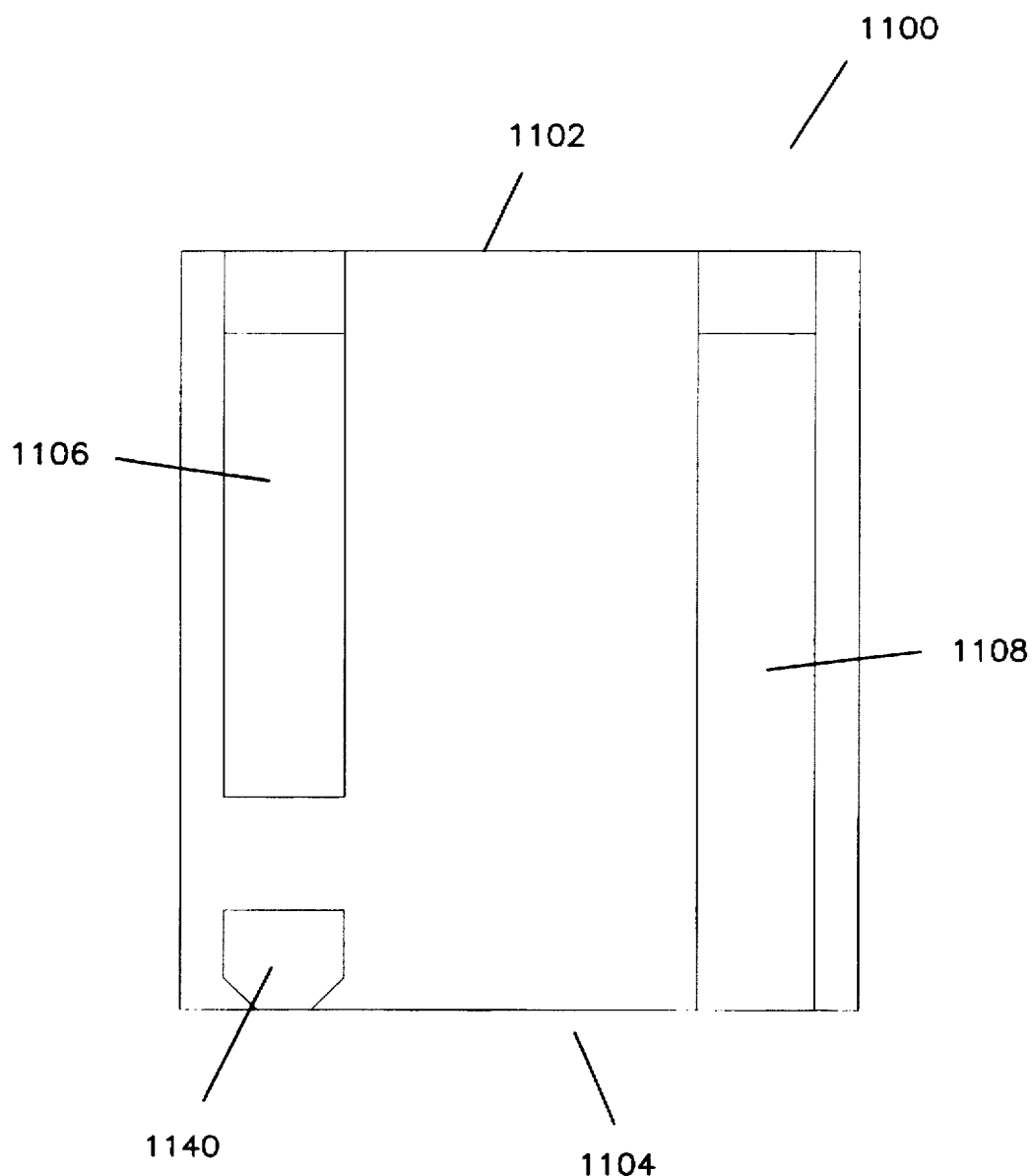
FIG. 11 illustrates an alternative two rail air bearing slider with a single landing pad according to the present invention.

FIG. 11 illustrates the features of an alternative air bearing slider 1100 with a landing pad 1140 according to the present invention. In FIG. 11, the air bearing slider 1100 includes two rails 1106, 1108 similar to that described with reference to FIG. 10. However, the right rail 1108 extends substantially to the trailing edge 1104. The landing pad 1140 is disposed opposite the trailing portion of the right side rail 1108 also substantially at the trailing edge 1104.

The foregoing description of the exemplary embodiment of the invention has been presented for the purposes of illustration and description. It is not intended to be exhaustive o r to limit the invention to the precise form disclosed. Many modifications and variations are possible in light of the above teaching. It is intended that the scope of the invention be limited not with this detailed description, but rather by the claims appended hereto.

What is claimed is:

1. An air bearing slider for supporting a transducer over a moving recording medium, comprising:

a slider body having side edges, a leading and a trailing edge relative to the motion of the recording medium, the slider body including an air bearing side having a recessed portion, the air bearing side also including structure forming an air bearing surface aligned along a pressurization plane for providing lift to the slider; and a landing pad, provided on the air bearing side such that contact between the medium and the slider body occurs with the landing pad rather than the recessed portion, the landing pad being non-contiguous with respect to the structure forming the air bearing surface and being laterally offset from a longitudinal centerline of the slider body.

2. The air bearing slider of claim 1 wherein the landing pad has a contact surface which is smoother than the recessed portion.

3. The air bearing slider of claim 1 wherein the landing pad has a contact surface which is recessed from the pressurization plane of the air bearing surface.

4. The air bearing slider of claim 1 wherein the landing pad has a contact surface which is in the pressurization plane of the air bearing surface.

5. The air bearing slider of claim 1 wherein the landing pad is disposed at an outer corner of the slider.

6. The air bearing slider of claim 1 wherein the landing pad comprises two landing pads, a landing pad being disposed at each outer corner of the slider proximate to the trailing edge.

7. The air bearing slider of claim 1 wherein the landing pad comprises two landing pads, a landing pad being disposed at each outer corner of the slider proximate to the leading edge.

8. The air bearing slider of claim 1 wherein the air bearing surface comprises a central rail terminating proximate to the trailing edge of the support structure, and wherein the landing pad comprises two landing pads, a landing pad being disposed at each outer corner of the slider proximate to the trailing edge.

9. The air bearing slider of claim 1 further comprising transverse pressurization contour steps which recess from the pressurization plane of the air bearing surface.

10. The air bearing slider of claim 1 further comprising stepped tapers proximate the leading edge of the slider.

11. The air bearing slider of claim 1 further comprising tapers adjacent the trailing edge of the slider body.

12. A data storage device, comprising:

a storage medium including a plurality of tracks;

a slider for supporting a transducer over the plurality of tracks, the slider further comprising:

a slider body having side edges, a leading and trailing edge relative to the motion of the recording medium and an etched surface area;

an air bearing surface, disposed on the slider body above the etched surface area and facing the moving recording medium, the air bearing surface providing a pressurization plane for providing lift to the slider; and a landing pad connected to the slider body having a contact surface which is smoother than the etched surface area, the landing pad being non-contiguous with respect to the air bearing surface and being laterally offset from a longitudinal centerline of the slider body, and the landing pad being configured for preventing the etched surface area from contacting the storage medium;

a motor, coupled to the storage medium, for moving the storage medium relative to the slider; and an actuator assembly connected to the slider body for moving the slider body generally transversely relative to the direction of a track on the storage medium so the transducer may access different regions on the storage medium.

13. The data storage device of claim 12 wherein the contact surface of the landing pad is below the pressurization plane of the air bearing surface.

14. The data storage device of claim 12 wherein the contact surface of the landing pad rises to the level of the pressurization plane of the air bearing surface.

15. The data storage device of claim 12 wherein the landing pad is disposed at an outer corner of the slider.

16. The data storage device of claim 12 wherein the landing pad comprises two landing pads, a landing pad being disposed at the outer corner of the slider proximate to the trailing edge.

17. The data storage device of claim 12 wherein the landing pad comprises two landing pads, a landing pad being disposed at the outer corner of the slider proximate to the leading edge.

18. The data storage device of claim 12 wherein the air bearing surface comprises a central rail terminating proximate to the trailing edge of the slider, and wherein the landing pad comprises two landing pads, a landing pad being disposed at the outer corner of the slider proximate to the trailing edge on opposite sides of the central rail.

19. The data storage device of claim 12, further comprising transverse pressurization contour steps which recess from the pressurization plane of the air bearing surface.

20. The data storage device of claim 12, further comprising stepped tapers proximate the leading edge of the slider.

21. The data storage device of claim 12, further comprising tapers adjacent the trailing edge of the slider body.

22. An air bearing slider for supporting a transducer over a moving recording medium, the slider comprising:

a slider body having an etched surface area;

at least one rail projecting above the etched surface area, the rail forming an air bearing surface aligned along a pressurization plane; and a landing pad which projects above the etched surface area and is separate from the rail, the landing pad including a contact surface that is smoother than the etched surface area and is recessed with respect to the pressurization plane of the air bearing surfaces wherein the landing pad is configured to prevent the etched surface area from contacting the recording medium.

23. The slider of claim 22, further comprising a cross-member which projects above the etched surface area and is configured for generating negative pressure, the cross member being separate from the landing pad.

24. The slider of claim 22, wherein the contact surface of the landing pad is a polished surface.

25. The slider of claim 22, wherein the landing pad is laterally offset from a longitudinal centerline of the slider body.

26. An air bearing slider for supporting a transducer at a desired fly height over a moving recording medium, the slider comprising:

a slider body having a recessed surface area;

structure forming an air bearing surface positioned above the recessed surface area and aligned along a pressurization plane; and a landing pad which projects above the recessed surface area and is configured to prevent the recessed surface area from contacting the recording medium when the slider body is subject to a roll condition, the landing pad being separate from the structure that forms the air bearing surface and being arranged and configured to not contribute significantly to the desired fly height of the slider.

27. The slider of claim 26, wherein the landing pad is recessed with respect to the pressurization plane of the air bearing surface.

28. The slider of claim 26, wherein the landing pad is offset from a longitudinal centerline of the slider body.

29. The slider of claim 26, wherein the landing pad has a contact surface that is smoother than the recessed portion area.

* * * * *